US005481397A

United States Patent [19]

Burt

[11] Patent Number: 5,481,397
[45] Date of Patent: Jan. 2, 1996

[54] QUANTUM WELL STRUCTURES

[75] Inventor: Michael G. Burt, Woodbridge, England

[73] Assignee: British Telecommunications, London, England

[21] Appl. No.: 836,002

[22] PCT Filed: Sep. 4, 1990

[86] PCT No.: PCT/GB90/01365

§ 371 Date: Feb. 26, 1992

§ 102(e) Date: Feb. 26, 1992

[87] PCT Pub. No.: WO91/03758

PCT Pub. Date: Mar. 21, 1991

[30] Foreign Application Priority Data

Sep. 4, 1989 [GB] United Kingdom .................. 8919933
Sep. 5, 1989 [GB] United Kingdom .................. 8919989

[51] Int. Cl.$^6$ ............................... G02F 1/36; G02F 1/015
[52] U.S. Cl. .......................... 359/298; 359/240; 359/318; 257/9; 257/14
[58] Field of Search .................................... 359/240, 298, 359/318; 257/9, 11, 12, 14, 53, 55; 372/26

[56] References Cited

U.S. PATENT DOCUMENTS

| 4,686,550 | 8/1987 | Capasso et al. | 257/14 |
| 4,826,295 | 5/1989 | Burt | 359/298 |
| 4,950,044 | 8/1990 | Marita | 359/298 |
| 5,008,717 | 4/1991 | Joseph et al. | 257/14 |
| 5,121,181 | 6/1992 | Smith et al. | 257/9 |

FOREIGN PATENT DOCUMENTS

| 143000 | 5/1985 | European Pat. Off. . |
| 0324505 | 7/1989 | European Pat. Off. . |
| 1103630 | 9/1989 | Japan . |

OTHER PUBLICATIONS

Hiroshima et al, Phys. Rev. B. Condens. Matter, vol. 38, #2, pp. 1241–1245, pp. Jul. 15, 1988; abst. only herewith.
Walmsley et al, Semicond. Sci. Technol., vol. 8, #2, pp. 268–275, Feb. 1993; abst. only provided herewith.
Enhanced Bandgap Resonant Nonlinear Susceptibility in Quantum–Well Heterostructures, M. G. Burt, Electronic Letters, Feb. 17, 1983, vol. 19, No. 4, pp. 132–133.
Auger Recombination in a Quantum Well Heterostructure, C. Smith, R. A. Abram & M. G. Burt, J. Phys. C: Solid State Phys., 16 (1983) pp. L171–175.
Gain Spectra of Quantum–Well Lasers, M. G. Burt, Electronics Letters, Mar. 17, 1983, vol. 19, No. 6, pp. 210–211.
Linewidth Enhancement Factor for Quantum–Well Lasers, Electronics Letters, Jan. 5, 1984, vol. 20, No. 1, pp. 27–28.
Auger Recombination in Long–Wavelength Quantum–Well Lasers, Electronics Letters, Oct. 11, 1984, vol. 20, No. 21, pp. 893–894.
Radiative Efficiency In Low Dimensional Semiconductor Structure, Electronics Letters, Aug. 15, 1985, vol. 21, No. 17, pp. 733–734.
Auger Recombination in a Quantum–Well–Heterostructure Laser, R. I. Taylor, R. A. Abram, M. G. Burt, C. Smith, IEE Proceedings, vol. 132, No. 6, Dec. 1985, pp. 364–369.
Erratum, M. G. Burt, Semiconductor Sci & Technology 2, 1987, p. 701.
Continuity Conditions for Envelope Functions at Semiconductor Interfaces Derived from the Bastard Model, R. I. Taylor & M. G. Burt, Semicond. Sci. Technol. 2, 1987, pp. 485–490.
An Exact Formulation of the Envelope Function Method for the Determination of Electronic States in Semiconductor Microstructure, M. G. Burt, Semicond. Sci. Technol. 3, 1988, pp. 739–753.

(List continued on next page.)

Primary Examiner—Nelson Moskowitz
Attorney, Agent, or Firm—Nixon & Vanderhye

[57] ABSTRACT

By forming quantum well (QW) structures with two different heterojunctions having different band offsets it is possible to form QWs having, when subjected to optical excitation, dipoles. The presence of a dipole in a narrow enough well results in QWs having absorption edges which, unlike those of conventional QWs can be shifted to the blue by application of an electric field of appropriate polarity.

32 Claims, 4 Drawing Sheets

OTHER PUBLICATIONS

A New Effective–Mass Equation for Microstructures, M. G. Burt, Semicond. Sci. Technol. 3, 1988, pp. 1224–1226.

Comments on "Comparison of Multiquantum Well, Graded Barrier, and Doped Quantum Well GaInAs/AlInAs Avalanche Photodiodes: A Theoretical Approach", M. G. Burt, IEEE Journal of Quantum Electronics, vol. 25, No. 5, May 1989, pp. 1126–1128.

Journal of Applied Physics, vol. 62, No. 8, 15 Oct. 1987, American Institute of Physics, T. Hiroshima et al: "Quantum–confined start effect in graded–gap quantum wells"—pp. 3360–3365.

Journal of Applied Physics Lett 45 (10), 15 Nov. 1984—"Staggered–lineup heterojunctions as sources of tunable below–gap radiation: Experimental verification" by E. J. Caine et al. pp. 1123–1125.

IEEE Electron Device Letters, vol. EDL–4, No. 1, Jan. 1983—"Staggered–Lineup Heterojunctions as Sources of Tunable Below–Gap Radiation: Operating Principle and Semiconductor Selection" by H. Kroemer et al—pp. 20–22.

QUANTUM WELL STRUCTURES

BACKGROUND OF THE INVENTION

1. Field of the Invention

This invention relates to quantum well structures, and in particular but not exclusively to such structures configured for use as optical modulators.

2. Related Art

In the broad field of optical signal processing there are many applications for high performance optical signal encoding and processing elements. For example, in high speed optical fiber communications systems, direct modulation of laser sources leads to undesirable wavelength shifts, "chirp", in the optical output of the laser. One way in which chirp may be avoided is to cease modulating the laser directly, optical modulation being achieved through use of a modulator in the optical path of the laser's output. In the generally less well developed area of optical signal processing, components such as logic gates, latches, and signal encoders are required. The bandwidth which optical signal processing and optical communications potentially offer means that there is a desire for components which operate at high speed, typically switchable at GHz rates, and preferably switchable at tens of GHz.

The present invention is concerned with such signal processing components, and in particular with modulators, which comprise quantum well structures. A quantum well is, in its simplest form, a double heterostructure, with a layer of low band-gap material sandwiched between two layers of higher band-gap material. Typically the layers all comprise semiconductors, for example the double heterostructure may consist of GaAs sandwiched between identical layers of AlGaAs. If the layer of low band-gap material is sufficiently thin, of the order of 100Å or less, the energy levels in the valence and conduction bands becomes quantised, and the structure is referred to as a "quantum well".

While single quantum wells do exhibit measurable quantum effects, the intensity or strength of the effects can be increased by increasing the number of quantum wells. Several, typically tens or many tens or hundreds of quantum wells are formed in a multilayer structure, which structures are referred to as "multiple quantum wells", or "multiple quantum well" ("mqw") structures.

The basis behind the use of quantum well structures as modulators is that they can exhibit large changes in their optical absorption coefficient on the application of an electric field.

In devices such as QW modulators, utilising excitonic effects, the exciton of most significance is that involving the n=1 heavy hole. In this specification, unless the context clearly requires otherwise, we refer to the n=1 heavy hole exciton.

Our own interpretation of the accepted explanation of this phenomenon will now be given with reference to FIG. 19 which shows, schematically, the behaviour of a conventional quantum well structure. The structure will be assumed to consist of a pair of GaAlAs layers 2, 2' with a GaAs layer 1 therebetween. Thin solid lines 3 and 4 indicate respectively the valence band maximum in bulk GaAlAs and GaAs. Thin solid lines 5 and 6 similarly indicate the conduction band minimum in bulk GaAlAs and GaAs respectively. However because the GaAs layer is thin enough to provide quantum confinement of the electrons and holes there is an increase in minimum energy for them both.

The new minima, the quantum well minima, for the electrons and holes are shown as broken lines 7 and 8 respectively. Note that in FIG. 19 electron energy increases towards the top of the Figure and hence hole energy increases as one moves down the Figure. With no applied field the resultant energy gap 9 is greater than that of the equivalent bulk GaAs. Typical probability density distributions of electrons and holes in the well are indicated by 10 and 11. The probability density distributions are pseudo-Gaussian and centered on the mid-point of the well.

FIG. 1b shows, schematically, the effect of applying an electric field across the layers of the well of FIG. 1a. With the field applied, the shape of the potential energy well seen by the electrons and holes changes dramatically. As a result of the changed band edge variation the probability density distribution of electrons follows the drop in minimum conduction band energy and hence moves to the right (the positive potential side) in FIG. 1b. Similarly, the hole distribution follows the fall in valence band minimum (hole) energy and hence moves to the left (the negative potential side) in FIG. 1b. The result is that the band gap shrinks. This is the so-called quantum-confined Stark effect. The change in band gap of course causes a shift in the absorption band edge, increasing absorption at lower photon energies (a red shift). Thus a quantum well device can be used as a modulator for wavelengths in the region of the band edge.

Unfortunately, in addition to the desired band edge shift there is a significant reduction in the absorption coefficient when a field is applied. In U.S. Pat. No. 4,826,295 the absorption coefficient for photon energies greater than the no-field band gap is estimated in one example to fall from about 2000 $cm^{-1}$ in the no-field case to about 300 $cm^{-1}$ in the with-field case. For photon energies just below the no-field band gap, but above the relevant with-field band gap, the absorption coefficient is estimated in U.S. Pat. No. 4,826,295 to rise from less than 10 $cm^{-1}$ with no field to about 300 $cm^{-1}$ with an applied field. While not preventing the use of quantum well structures in practical modulators, the fact that an absorption coefficient drop is associated with the desired field-induced band edge shift is nevertheless a disadvantage of known quantum well optical devices.

In European patent application 0324505 there is described a second-harmonic generator or frequency doubler which comprises a quantum well structure. According to 0324505, the conversion of radiation of angular frequency $\omega$ to radiation having an angular frequency $2\omega$, in a non-linear material, has an efficiency proportional to the square of that material's non-linear receptivity $\psi^{(2)}$. In EP 0324505, a dipole moment is induced in a quantum well structure, $\psi^{(2)}$ of that structure being proportional to the size of the dipole moment. In the first embodiment in '505, the well comprises 120Å of GaAs sandwiched between AlAs barrier layers. Several such wells, together with thicker, charge-separating layers of AlAs, form the intrinsic region of a p-i-n structure. By applying an electric field across the layers, the centers of gravity of the wave functions of the electrons and holes in the well shift, creating a dipole moment. With an applied field of unspecified strength, $\psi^{(2)}$ of the aforementioned structure is said to be 400 times as large as that of $LiNbO_3$, and 5000 times as large as that of KDP.

The angular frequency, $\omega$, of the radiation to be up-converted is chosen to satisfy the relation $2\hbar\omega \equiv Eg$, where Eg is the bandgap of the well material (here GaAs, whose bandgap is 1.42 Ev at 300K).

In place of the AlAs in the barrier layers, $Al_xGa_{1-x}As$ can be used, and this permits the construction of a waveguiding quantum well structure, further increasing the efficiency of conversion.

3

As an alternative to the formation of a dipole as the result of an applied field, an embodiment is proposed in which a dipole is formed by varying the composition of the well from $(InAs)_{1-x}(GaAs)_x$ to $(GaSb)_{1-y}(GaAs)y$ across the well width, AlAs barrier layers being used. This structure is suggested to give second harmonic generation with an efficiency as high as that in the first embodiment described above. Also it is stated that this graded structure allows one to dispense with the electrodes and power source used in the first embodiment, since the application of an electric field is no longer necessary.

Further embodiments in '505 include a modulator for modulating the bias electric field, thereby modulating $\psi^{(2)}$ and hence modulating the harmonic wave.

In a further embodiment a filter is provided at the optical output of the qw structure, the filter passing the second harmonic wave ant blocking the low frequency input signal. This embodiment is also proposed for use in combination with the modulator or the graded-composition well.

Nowhere in '505 is there any suggestion that any advantage is to be obtained for applications other than second-harmonic generation by having a quantum well structure having a compositionally induced dipole.

Nowhere in '505 is there any suggestion that there is any merit in providing a quantum well structure having a compositionally induced dipole with electrodes. In this connection it should be noted that in '505 it is suggested that with a graded structure the dipole is fixed and hence $\psi^{(2)}$ is fixed, while modulating the bias voltage on a non-graded well structure—where $\psi^{(2)}$ is dependent on the size of the applied field, results in a desired modulation of the second harmonic signal through modulation of $\psi^{(2)}$.

In their paper in journal of Applied Physics, Vol. 62, No. 8, pp 3360–3365, Hiroshima and Nishi describe a graded-gap quantum well (GGQW) structure in which there is an effective 'internal' electric field which concentrates the carriers on the same side of the well in both the conduction and valence bands. The authors note that such a structure can be realized by varying the alloy composition in the well layer so that the band gap varies linearly within the well. The paper deals with a theoretical analysis of the so-called quantum-confined Stark effect with particular attention being paid to excitonic effects. The structure on which their theoretical analysis is built is a GGQW comprising an $Al_xGa_{1-x}As$ well layer, 100Å thick, in which the aluminum content x varies from 0 to 0.15 along the growth direction, and $Al_{0.6}Ga_{0.4}As$ barrier layers. The authors note that the electron and light-hole envelope functions for various applied field conditions are nearly symmetric and are less effected than the heavy-hole envelope function by an external applied field.

It is interesting to note that Hiroshima and Nishi are concerned only with their linearly-graded gap quantum well structure, which in their words "has an effective "internal" electric field which concentrates the carrier on the same side of the heterointerface in both the conduction and valence bands". Nowhere do they suggest that pushing the electrons and holes to the same side of the well with a built-in field is a bad idea or that there is anything to be gained by building a structure in which the electrons and holes are pushed to opposite sides of the well by a built-in field. The authors are not concerned with establishing a structure which inherently produces electron-hole pairs as dipoles and do not teach towards such a concept. From our own study of the paper, it appears that the structure which they describe does produce a small inherent dipole, probably with a dipole moment of no more than 5Å.

4

BRIEF SUMMARY OF THE INVENTION

The present invention seeks to provide quantum well structures in which field-induced band edge shifts can be achieved without a significant accompanying change in absorption coefficient.

The present invention seeks to provide quantum well devices, and in particular quantum well modulators, which have a reduced sensitivity to small variations in well width and/or reduced sensitivity to electric field nonuniformities within the devices during their operation.

The present invention also seeks to provide quantum well devices of the type described, which devices have operating voltage requirements lower than those of comparable prior art devices.

BRIEF DESCRIPTION OF THE DRAWINGS

Preferred embodiments of the present invention will now be described, by way of example only, with reference no the accompanying drawings in which.

DETAILED DESCRIPTION OF EXEMPLARY EMBODIMENTS

Figure 1A:
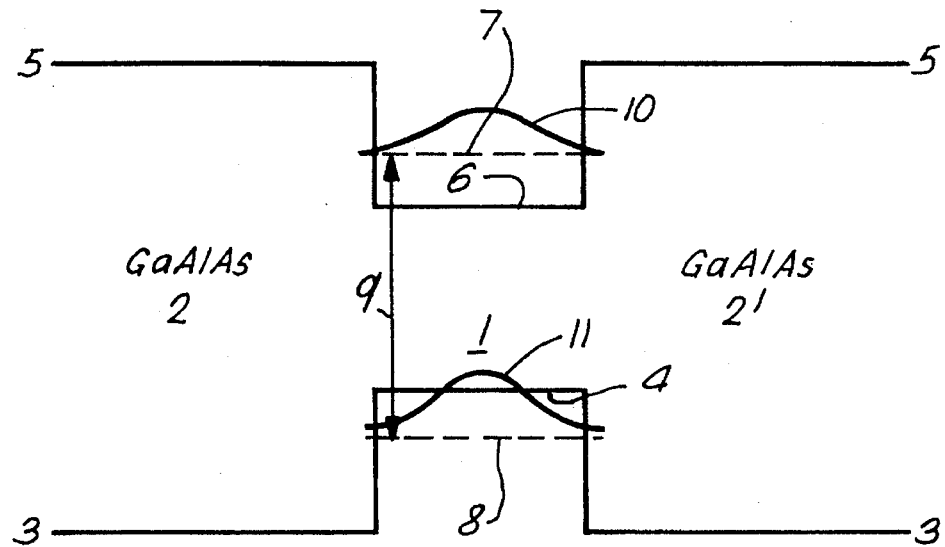
FIG. 1(a) is a schematic energy band diagram for a single quantum well with zero applied electric field.
Figure 1B:
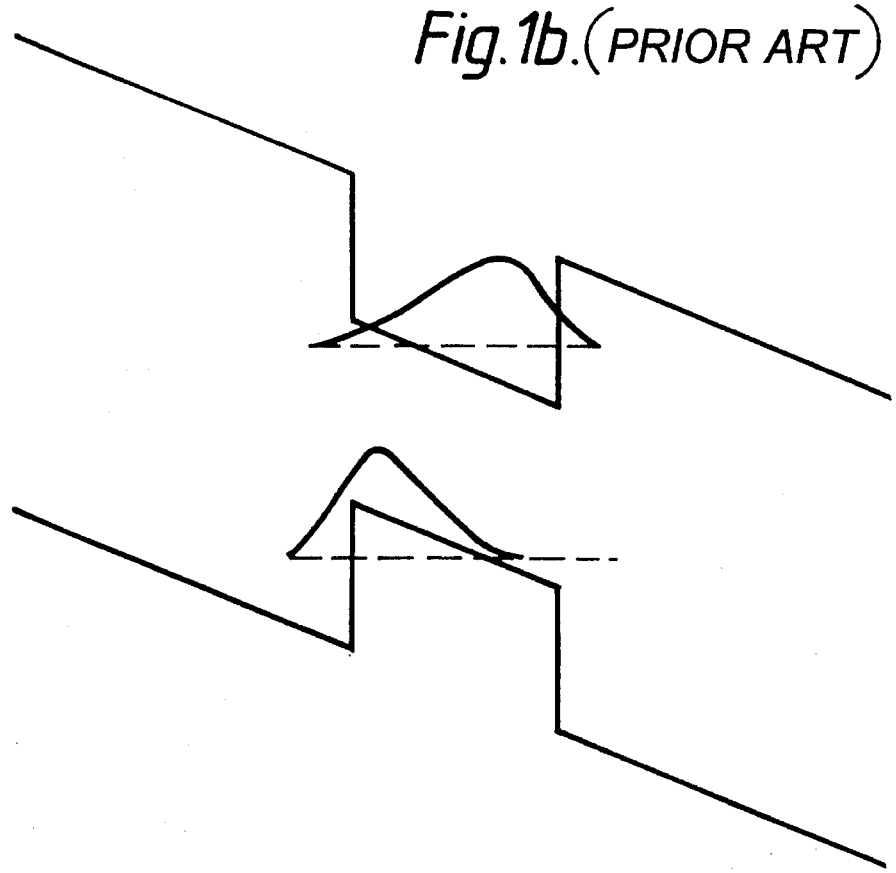
FIG. 1(b) is a schematic energy band diagram for the quantum well of FIG. 1(a) with an applied electric field.
Figure 2:
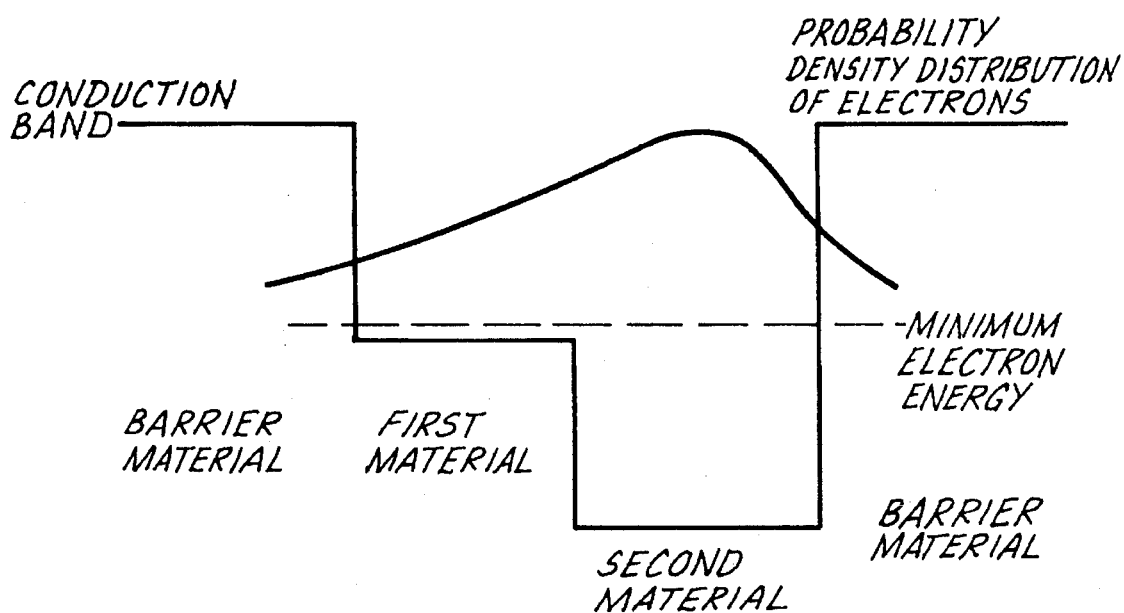
FIG. 2 is a theoretical absorption spectrum of a conventional quantum well in the presence or absence of an applied electric field.

The invention in its broadest sense is perhaps best explained by reference go the behaviour of a conventional quantum well structure such as that represented in FIGS. 1(a) and 1(b). The following explanation or description of the behaviour of such a conventional quantum well structure is unusual, but is believed to make explanation of the present invention much easier. The non-expert reader will no doubt be thankful for the general absence of calculus!

Consider an electron-hole pair in its ground state in a conventional symmetric square QW. In the absence of an applied or built in field the charge density (10 and 11) of both the electron and hole will have its 'center of gravity' coincident with the center of the well. The energy needed to create this ground state, ie the photon energy needed to promote the electron from the top of the valence band to the bottom of the conduction band, is just the bandgap, 9, of the QW. (We neglect the electrostatic attraction between the electron and the hole that gives rise to the formation of excitons since this plays only a minor role in the so called quantum confined Stark effect). When an electric field is applied to the quantum well the energy needed to create the above mentioned electron hole pair, the band gap energy, will change; and subsequently there will be electroabsorption so all we need to do to understand how the QW band gap changes with applied electric field is to understand how the minimum energy needed to create an electron hole pair changes in the same circumstances.

To find how the energy of an electron hole pair changes when an electric field is applied we can picture the pair as a polarisable atom. When the field is applied, the positively charged hole will move to the down field side of the well while the negatively charged electron will move in the opposite direction towards the up field side of the well. The 'centers of gravity' of the two charge distributions will no longer be in the same place and consequently an electric dipole moment will have been induced. Elementary electrostatics tells us that the energy of an electrically neutral system with a dipole moment, p, in a field, F, is just $-pF$. Hence when the dipole moment is in the same direction as the field, as in our case, then the system has a lower energy in the presence of the field than in its absence. Hence the minimum energy needed to create an electron-hole pair, ie the band gap, decreases with increasing applied field. There is an associated red shift and decrease in height of the absorption edge. The decrease in height comes about because the electron and hole are separated by the field and it is more difficult for the light to create spatially separated electron hole pairs than electron hole pairs in which the carriers have the same charge distributions.

While the above arguments give a qualitative understanding of the quantum confined Stark effect, it is not quantitative. To make the arguments quantitative, which is important for an appreciation of some of the advantages of the invention, we must include the work done on the electron hole pair during its formation. Again elementary electrostatics tells us that the work done in creating the dipole is $+(\alpha_p F^2)/2$, where $\alpha_p$ is the polarisability of the electron hole pair. This raises the energy of the dipole by the same amount. So the change, $\alpha E$ in the energy of the electron hole pair due to the presence of the field is $$\Delta E = -pF + (\alpha_p F^2)/2 \quad (1)$$

But, by the definition of the dipole moment and the polarisability, $$p = \alpha_p F \quad (2)$$

so that $$\Delta E = -(\alpha_p F^2)/2. \quad (3)$$

Note that the shift in the adsorption edge (which is to the red) is the same regardless of the direction in which the field is applied.

We have seen that the shift in the absorption edge varies as the square of the total field experienced by the electron hole pair. This field will in general be a combination of built-in and applied fields. Ideally, one would want this total field to be the same for all the quantum wells in a device such as a modulator so that the adsorption edges of the wells move in unison, and an optimum extinction ratio results. However, there will inevitably be field nonuniformities and hence corresponding variations in the shifts in the absorption band edge. These shifts in the absorption band edge throughout the device will be magnified by the quadratic dependence on the field, the result being that the fractional variation of $\Delta E$ from well to well will be double the fractional variation in F from well to well.

Inhomogenities in the electric field are by no means the only problem. Variations in well width, L, can also produce problems. When one evaluates the polarisability of a conventional quantum well one finds that it varies as $L^4$. Hence any fractional variation in the width of the quantum wells in a surface modulator (that is one in which light propagates in a direction normal to the planes of the quantum well layers) will give rise to a fractional variation in the bandgap 4 times that in the well width. This results in a smearing of the absorption edge when an electric field is applied additional to the smearing already present due to inhomogeneities in the applied field.

It is clear that these properties make the design and fabrication of modulators and in particular surface modulators using conventional quantum wells particularly demanding.

The preceding analysis of the operation and deficiencies of conventional quantum well structures is the result of our appreciation of the potential benefits offered by the present invention. As far as we are aware, no—one has previously considered or described the operation of quantum well structures in terms of electrostatics. We have realised that the problems arise in the conventional quantum well devices such as modulators because the electroabsorption is essentially the result of two conflicting processes. On the one hand, the turning on of the field raises the energy of the system by performing work on it during the creation of the dipole. On the other hand, the presence of the field lowers the potential energy of the system by virtue of the presence of the dipole. Looked at in this way it is not surprising, therefore, that the end result, the shift in the absorption edge, is sensitive to parameters such as F and L. There is also another unsatisfactory aspect. In order to shift the absorption edge one must create a dipole. In so doing one makes absorption more difficult and so one is in fact degrading the very property one is trying to exploit, namely the high band edge absorption!

Having first realised, with the help of our electrostatic approach, that the applied field is changing the band gap as the result of first forming a dipole and then acting on the dipole to lower its energy, we further realised that we could overcome many of these problems by producing asymmetric QW structures which automatically produce electron-hole pairs as dipoles.

If a suitable asymmetric QW is used, then an electron-hole pair will already have an intrinsic dipole moment, $p_i$, and there is no need to create one; the 'centers of gravity' of the electron and hole charge distributions will naturally be in separate places. Additionally, if one uses a narrow well then, if the well is narrow and deep enough to bind the carriers strongly, the polarisability will be small. To a good approximation, the change, $\Delta E$, in the band gap in the presence of a field, F, is given by $$\Delta E = -p_i F \quad (4)$$

ie equation (1) with $\alpha_p = 0$. Equation (4) immediately shows us the benefits of QWs which produce electron-hole pairs are dipoles. Because $p_i$ is independent of electric field then $\Delta E$ depends only linearly on the field. Since $p_i$ is essentially a displacement between the 'centers of gravity' of two charge distributions one expects in to vary more nearly linearly with well width, L. We now see than the shift in the absorption edge is much less sensitive to variations in electric field and well widths than the conventional QW. A much 'cleaner' electroabsorption characteristic is therefore expected of suitably designed QW and MQW structures.

There is also another advantage in using wells which produce electron-hole pairs dipoles which is revealed on closer examination of equations (3) and (4). Rewrite (3) in terms of the dipole moment, $p_c$, induced in the conventional QW $$\Delta E = -(p_c F)/2 \qquad (5.$$

We see that for a given $\Delta E$, the dipole $p_c$ induced in the conventional QW is twice as large as $p_i$, the intrinsic dipole needed in the asymmetric QW. This means that when the field is applied, the intrinsic dipole QW has a superior absorbance per well, because the electron and hole charge distributions have more overlap. The absorbance per micron of material is further increased if one uses narrow wells because one can fit more narrow wells per micron than those of conventional thickness. Additionally, for fixed $\Delta E$, and $p(=p_c=p_i)$ the field (and thus the voltage) required with a fixed dipole structure is half that needed for a conventional structure.

The arguments presented above show that the desirable features of the electroabsorption characteristics of modulators and in particular surface modulators containing conventional symmetric quantum wells are inherently vulnerable to nonuniformities in well widths and applied fields. As such the engineering of modulators using such quantum wells is difficult. Simple arguments suggest that asymmetric quantum wells which produce electron-hole pairs or dipoles provide (1) a way of reducing modulator susceptibility to these nonuniformities and (2) an enhanced extinction ratio, or alternatively the same extinction ratio as in the conventional device but with lower voltages.

For optimum results where one is not constrained to use very low (i.e. 1 to 5 volts) operating voltages we believe that the well width, that is the width of the region which will hold both electrons and holes, should be no more than about 50Å. This region will of course be made up of at least two materials, since at least two offset bandgaps are needed to ensure the spatial separation of the carriers needed for the creation of the intrinsic dipole moment. The different materials for the well region will, in many cases, be ternaries or quaternaries, or one or more of each, formed from essentially the same elements.

Figure 3:
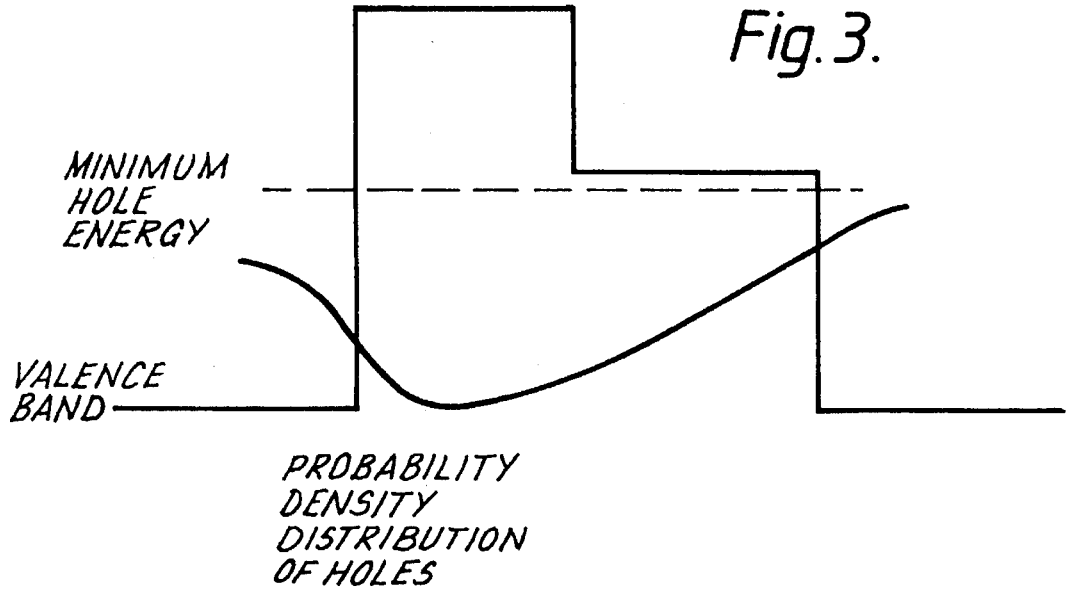
FIG. 3 is a schematic energy level diagram for a single quantum well according to the present invention.

FIG. 3 illustrates schematically the insensitivity of carrier probability density distribution with respect to minimum energy level. The presence of the deed wells in the conduction and valence bands skews the carrier distributions even though the minimum energy levels are "above" the energy ranges of the deep wells.

As mentioned above, to ensure low polarisability, deep wells are necessary for the electrons and holes.

Where the QW structure is to be driven with low applied voltages, for example less than about 5 volts, optimum performance will generally be achieved with somewhat wider wells, for example up to about 100Å.

Materials

Figure 4:
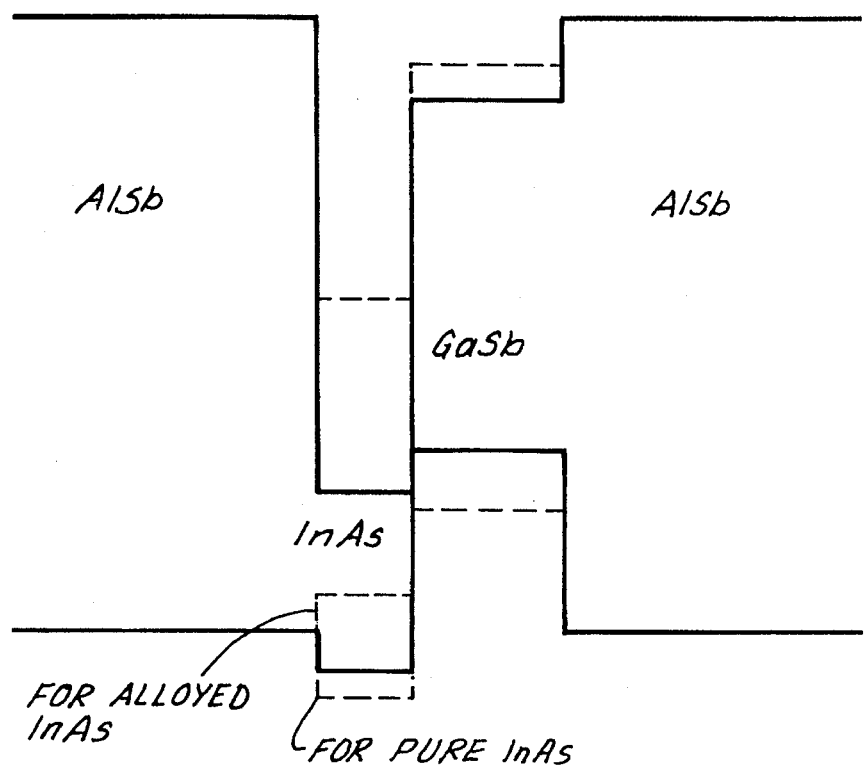
FIG. 4 is a schematic energy level diagram for a single quantum well according to the present invention, the well consisting of a layer of essentially gallium antimonide, and a layer of essentially indium arsenide, the barrier layers comprising aluminum antimonide.

As will by now be clear, the quantum well structures according to the invention have conduction band profiles which tend to push the electrons in the well to one side of the well and valence band profiles which tend to push the holes in the well towards the opposite side of the well. One suitable materials system uses aluminum antimonide (AlSb) barriers with quantum wells formed of gallium antimonide (GaSh), for hole confinement, and indium arsenide (InAs), for electron confinement. A schematic energy level diagram of such a quantum well structure is shown in FIG. 4. The solid lines in FIG. 4 represent the conduction and valence band levels for the bulk semiconductors and illustrate the overlap between the conduction band in InAs and the valance band in GaSb. However, as explained previously, quantisation of the energy levels when there is 'quantum confinement' leads to an increase in the minimum allowable energies for electrons and holes in the well, and hence the overlap disappears. In particular electrons in InAs are very light and hence are easily quantised. Typical energy levels for the quantum well are indicated by the broken lines.

Of course the constituent compounds, and elements, of this system can readily be alloyed, and hence device characteristics can be tailored, for example by selecting alloy compositions for the quantum well layers which give the desired bandgap. In particular there are advantages in forming the hole confining region from an InAs rich alloy of InAs and GaSh.

Of course, as those skilled in the art will appreciate, while quantum well structures according to the present invention are preferably based on the above described materials system, there are other materials systems which could be used. One such system which is capable of providing quantum well structures according to the invention is that comprising indium antimonide (InSb), cadmium telluride (CdTe) and mercury telluride (HgTe). It is known to use HgTe and CdTe alone in quantum well structures, for example see the paper by Guldner et al, in Physics Review Letters, Vol. 51, p907, 1983, but not in combination with InSb. Fortunately InSb is lattice matched to CdTe, so its incorporation into the known two component system is possible. CdTe would provide the barrier layers. Bulk InSb has only a small band gap, 0.2 eV, and bulk HgTe has no band gap. Quantum confinement gives rise to a band gap in HgTe, and causes the band gap of InSb to increase.

Preferably, with the proposed GaSb/InAs/AlSb quantum well structures a GaSb substrate is used. The reason for this choice is that both InAs and AlSb are slightly imperfectly lattice matched to GaSb, but in opposite senses. If appropriately dimensioned InAs and AlSb layers are grown alternately on GaSb, the strains tend to cancel each other out, with the result that greater overall thicknesses can be grown.

Also, it should be noted that FIG. 4 illustrates what is in effect the simplest realisation of the invention: there are just two regions in the quantum well, one for confinement of holes, the other for confinement of electrons. While of course it is generally preferable, from the point of view of crystal growth, to keep the number of components and the number of different layer types to a minimum, it may still be found worthwhile to incorporate more components and/or more different layer types to enable the use of different alloy systems or to permit the production of more complex structures which have good electron and hole confinement and separation. Barrier widths of 50Å–100Å are typical.

Normally the barrier layers will comprise a simple semiconductor, but there may be applications where it is advantageous to use alloyed semiconductors or even near insulators for the barrier layers. The advantage of using simple semiconductors is that they are easier to grow well.

While barrier widths will normally be in the range 50Å to 100Å, the optimum width for any particular application should be determined by routine experimentation. The barrier width should be sufficient to at least substantially prevent tunnelling between wells when the working potential is applied, the object being for adjacent wells to be unaffected by each other. Because the probability of tunnelling is determined by the effective barrier height, thinner wells will in general need thicker barrier layers, all other things being equal. Likewise in materials systems where the effective barrier heights are necessarily low, it will generally be necessary to use barrier layers thicker than those required in the GaSb/InAs/AlSb system. It is undesirable so use barrier layers which are thicker than necessary, since excess barrier thickness will reduce the field intensity 'seen' by the quantum wells for any particular applied voltage. An additional and significant disadvantage of excess barrier thickness is that it is wasteful of epitaxial growing time and ability—generally it would be more useful to grow a multiple quantum well structure comprising a greater number of wells.

The following examples based on the InP/GaInAsP/InGaAs system are included to show how it is possible to create significant and useful dipole moments even with materials which do not provide very deep wells. In terms of the invention, this materials system is very much non-optimum, but nevertheless applying the invention to this 'everyday' materials system does give appreciable advantages. Well widths of 60Å are assumed in these examples, but this is not critical.

EXAMPLES

For two-part quantum wells of GaInAsP and InGaAs between InP barriers, calculations of dipole moments for electrons and holes for different phosphorus contents in GaInAsP. An InP substrate was used, the InGaAs being lattice matched to InP.

1. For InGaAs sub-well of width 25Å, with a GaInAsP$_y$ sub-well of width 25Å.

| Molar concentration of P | Hole Dipole Moment Å | Electron Dipole Moment Å | Difference Dipole Moment Å |
|---|---|---|---|
| 0.05 | 2.59 | 0.54 | 2.05 |
| 0.10 | 4.85 | 1.10 | 3.75 |
| 0.15 | 6.63 | 1.68 | 4.95 |
| 0.20 | 7.95 | 2.28 | 5.67 |
| 0.25 | 8.91 | 2.90 | 6.01 |
| 0.30 | 9.62 | 3.52 | 6.10 |
| 0.35 | 10.17 | 4.17 | 6.00 |
| 0.40 | 10.59 | 4.82 | 5.77 |
| 0.45 | 10.92 | 5.49 | 5.43 |
| 0.50 | 11.20 | 6.15 | 5.05 |
| 0.55 | 11.42 | 6.82 | 4.60 |
| 0.60 | 11.61 | 7.49 | 4.12 |
| 0.70 | 11.92 | 8.82 | 3.10 |
| 0.80 | 12.15 | 10.10 | 2.05 |
| 0.90 | 12.34 | 11.34 | 1.00 |

2. For 50Å sub-well widths: 50Å InGaAs, 50ÅGaInAsP$_y$.

| Concentration of phosphorus | Dipole Moment Difference Å |
|---|---|
| 0.02 | 5.499 |
| 0.04 | 9.614 |
| 0.06 | 12.140 |
| 0.08 | 13.521 |
| 0.10 | 14.187 |
| 0.12 | 14.417 |
| 0.14 | 14.374 |
| 0.16 | 14.156 |
| 0.18 | 13.821 |
| 0.20 | 13.409 |
| 0.22 | 12.943 |
| 0.24 | 12.442 |
| 0.26 | 11.920 |
| 0.28 | 11.386 |
| 0.30 | 10.846 |

3. For sub-wells of 17.58Å (6 mono-layers) GaInAs, and 41.02Å (14 mono-layers) GaInAsP.

| Molar Concentration phosphorus | Dipole Moment Difference Å |
|---|---|
| 0.2 | 10.352 |
| 0.25 | 11.602 |
| 0.30 | 12.139 |
| 0.35 | 12.189 |
| 0.40 | 11.909 |
| 0.45 | 11.397 |

Figure 6:
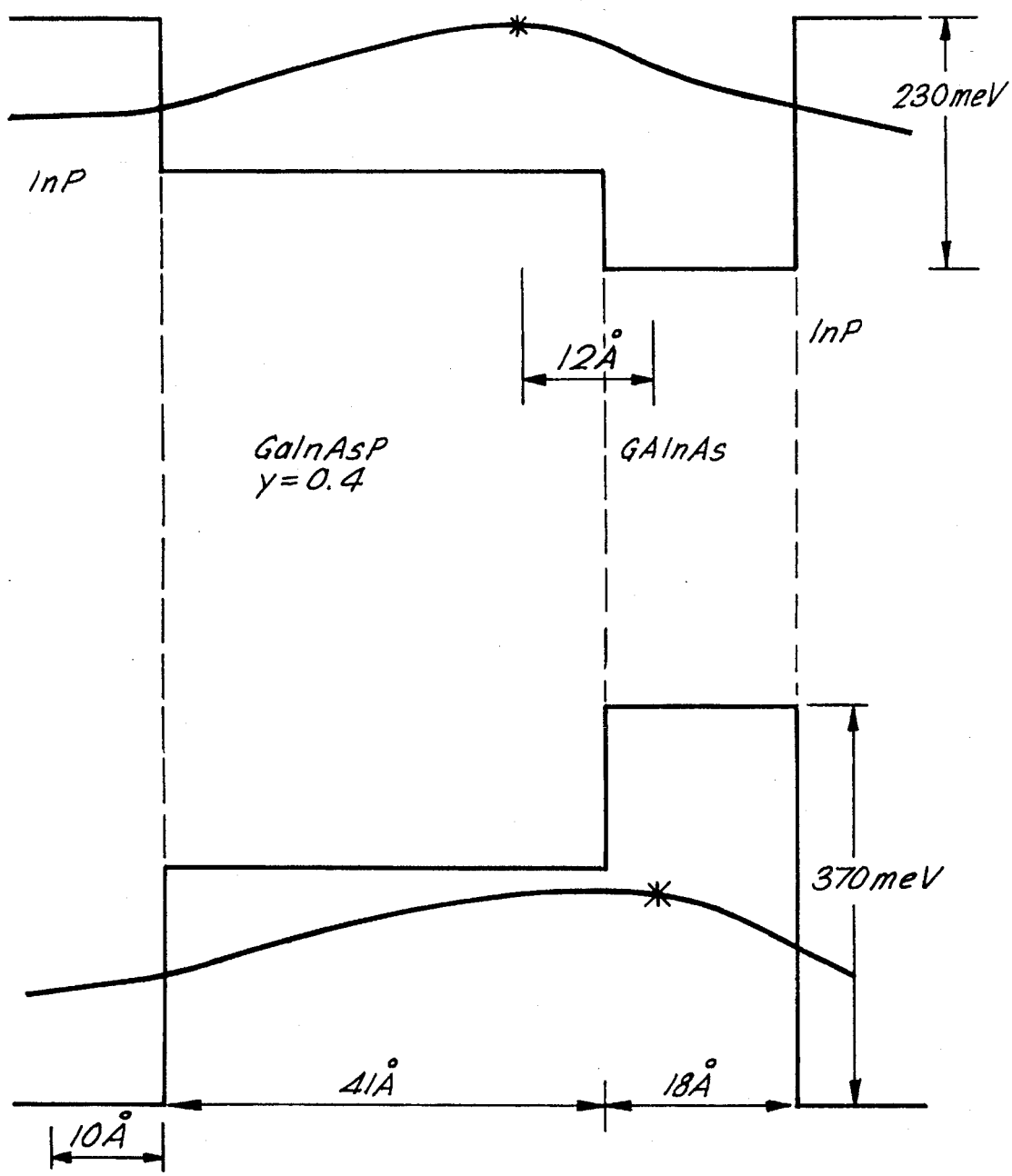
FIG. 6 is a schematic energy level diagram for a single, non-optimum, quantum well according to the present invention.

FIG. 6 shows the band-gap and notional probability density distributions for electrons and holes for this structure with a molar concentration of phosphorus of 0.40. The notional displacements of the 'centers of gravity' of the hole and electron distributions are shown as stars.

As with other QW modulators, modulators according to the present invention will routinely be in the form of a PIN structure with the quantum wells in the intrinsic region. Also conventional is the use of charge separating layers of intrinsic material to each side of the QWs, to ensure uniformity of field. The charge separating layers are conveniently formed of the material used in the barrier layers of the QWs, and anyway are chosen to have a bandgap greater than that of the low gap material in the QWs on either side of the intrinsic region there are respectively provided a p and an n region to which the device's electrodes are connected. Typically, metal electrodes forming ohmic contacts with the p and n regions are used.

In a further embodiment the invention provides a tuneable Bragg reflector comprising multiple multiple-quantum-well stacks, each mqw stack comprising quantum well structures according to the invention and grown in one sense, alternate mqw stacks having the growth sense reversed. By growing each mqw stack of quantum wells grown in one sense, than is with their intrinsic electron-hole dipoles disposed in the same sense (poled), and then growing the next mqw stack with the intrinsic electron-hole dipoles poled in the opposite sense, and so on, a structure is created in which, on application of a suitable potential thereacross, the refractive indices of alternate layers can be varied in opposite directions.

Figure 5:
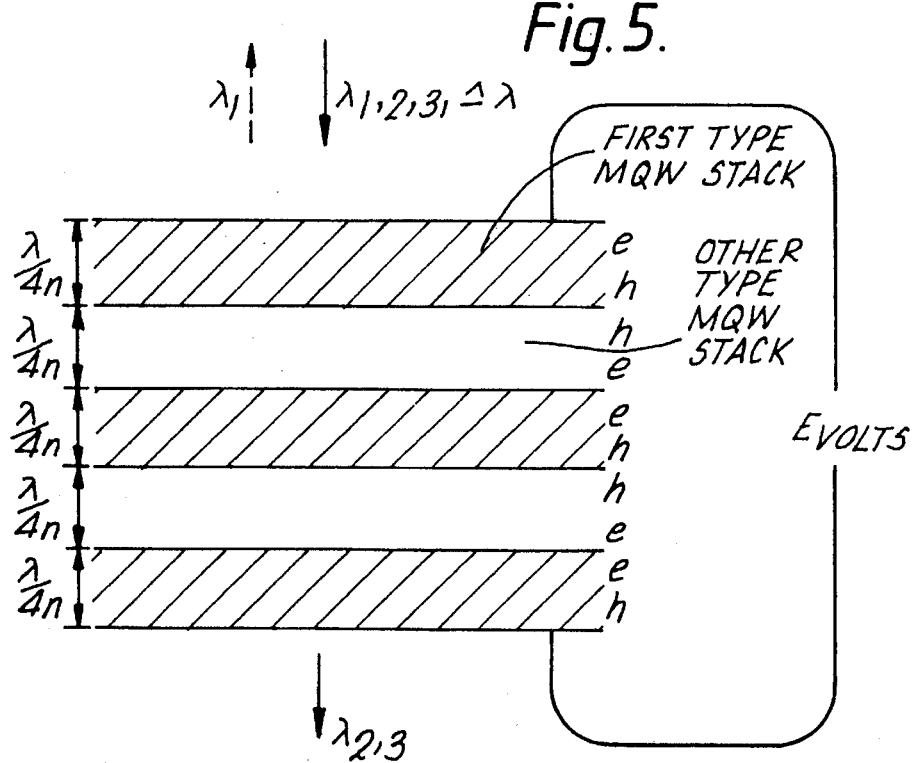
FIG. 5 is a schematic cross-section through a tuneable Bragg reflector according to the invention.

An example of such a structure is shown schematically in FIG. 5. Such structures are useable as tuneable Bragg reflectors in either waveguide or surface configuration, the latter configuration being illustrated in FIG. 5. In the structure illustrated, which is designed for normal light incidence, the mqw stacks are each of a thickness approximately equal to one quarter of the device's operating wavelength—that is, each layer has a thickness of $\lambda/4n$, where n is the refractive index of the layer at the wavelength $\lambda$. The operating wavelength can be near the band-gap—equivalent wavelength, in which case there can be strong refraction but with the possibility of absorption, or longer wavelengths can be used with correspondingly reduced refraction. An electric field is applied, normal to the planes of the layers, by means of electrodes on the end faces 50, 51 of the structure. A material such as indium tin oxide ITO, which is electrically conductive and which transmits light, may be applied to the end faces of the structure for use as electrodes. More generally, metallic contacts will be applied to the end faces. The number of layers in each stack and the number of stacks in the structure are not critical and the optimum numbers for any particular application may be determined by routine experimentation. The upper limit on both numbers will in general be set by the maximum thicknesses which can be grown while maintaining good epitaxial growth, by the operating wavelength range, and by the requirements for the driving field and for optical performance.

As those skilled in the art will be aware, in order to ensure electric field uniformity, it is desirable to provide charge separating layers of intrinsic material between the electrodes and the mqw stacks. Conveniently this intrinsic material may have the same composition as the barrier layers in the MQWs. Schottkey contacts can be provided to the structure using appropriate contacts. Alternatively, a PIN structure may be used, the mqw and charge separating layers constituting the intrinsic region thereof.

Typically each mqw stack would comprise between 10 and 100 quantum wells, more typically 25 to 50, for example 40. Typically there will be between 3 and 50 stacks in total, more typically between 10 and 40, for example 30.

Tuneable Bragg reflectors in waveguide configurations can readily be constructed, although of course the layer thicknesses and numbers and number of stacks will in general differ from those used in the above described surface configuration.

Tuneable Bragg reflectors according to the invention may conveniently be produced using the InP, InGaAs, GaInAsP material system. By selecting GaInAsP compositions with phosphorus contents which give the largest dipole moments for the well widths chosen, good optical performance can be obtained. Examples 1, 2 and 3 above give an indication of suitable well-widths, compositions and phosphorus contents.

Bragg reflectors comprising QWs formed from the other materials systems set out above can be expected to provide performance significantly improved over that obtained with the InP, InGaAs, GaInAsP system.

I claim:

1. A quantum well structure comprising:
   first and second electrodes for application of an electric field normal to layers of the well,
   a quantum confinement region being formed without regions of graded compositional change,
   and having a conduction band profile tending to push electrons in the region to one side of the region and a valence band profile tending to push the holes in the region towards the opposite side of the region, and wherein electron-hole pairs with a dipole moment are produced by optical excitation of the structure.

2. A quantum well structure comprising: first and second electrodes for application of an electric field normal to layers of the well,
   a quantum confinement region including a heterostructure of two distinct regions having different compositions, and
   wherein electron-hole pairs with a dipole moment are produced by optical excitation of the quantum well structure.

3. A quantum well structure comprising:
   first and second electrodes for application of an electric field normal to layers of the well,
   the quantum well structure includes a quantum confinement region comprised of a heterostructure so that electron-hole pairs produced by optical excitation of the quantum well structure are produced with a dipole moment of not less than 5 Angstroms.

4. A quantum well structure as in claim 1, comprising:
   first and second barrier layers defining therebetween a quantum confinement region within which there is a heterostructure,
   first and second materials of said heterostructure having different conduction band minima and different valence band maxima,
   the first material having the lower conduction band minimum, the second material having the higher valence band maximum, and
   the resultant distortion of the carrier probability density distributions producing a dipole when the well structure is optically excited.

5. A quantum well structure as in claim 1, comprising:
   a quantum confinement region within which there is an overlap of the probability density distributions of the electrons in the conduction band and the holes in the valence band,
   a heterostructure within the quantum confinement region giving rise to a skewing of the distributions such that on optical excitation of the quantum confinement region a dipole moment is created within the quantum confinement region.

6. A quantum well structure, comprising:
   first and second barrier layers defining therebetween a quantum confinement region, the quantum confinement region comprising adjacent said first barrier layer a first material region, and
   adjacent said second barrier layer a second material region, said first and second material regions abutting each other, and
   each said material region having an essentially uniform composition throughout its thickness, the conduction band minimum in said first material region being at a lower energy than that in said second material region and the valence band maximum being at a higher energy in said first material region than in said second,
   the thickness of said first and second material regions and their composition being such that the probability density distribution of electrons in the conduction band of said quantum confinement region is skewed towards said first barrier layer, and the probability density distribution of holes in the valence band of said quantum confinement region is skewed towards said first barrier layer so that optical excitation of the confinement region produces electron-hole pairs having a dipole moment.

7. A quantum well structure as in claim 1, comprising:
   first and second barrier layers defining therebetween a quantum confinement region,
   the quantum confinement region comprising adjacent said first barrier layer a first material region, and adjacent said second barrier layer a second material region,
   said first and second material regions abutting each other, and
   each said material region having an essentially uniform composition throughout its thickness,
   the conduction band minimum in said first material region being at a lower energy than that in said second material region and the valence band maximum being at a higher energy in said second material region than in said first,
   whereby the probability density distribution of electrons in the conduction band of said quantum confinement region is skewed towards said first barrier layer, and the probability density distribution of holes in the valence band of said quantum confinement region is skewed towards said second barrier layer.

8. A quantum well structure as in claim 1 wherein the dipole moment is not less than 6 Angstroms.

9. A quantum well structure as in claim 8, wherein the dipole moment is not less than 7 Angstroms.

10. A quantum well structure as in claim 9, wherein the dipole moment is not less than 8 Angstroms.

11. A quantum well structure as in claim 10, wherein the dipole moment is not less than 9 Angstroms.

12. A quantum well structure as in claim 11, wherein the dipole moment is not less than 10 Angstroms.

13. A quantum well structure as in claim 12, wherein the dipole moment is not less than 11 Angstroms.

14. A quantum well structure as in claim 13, wherein the dipole moment is not less than 12 Angstroms.

15. A quantum well structure as in claim comprising gallium antimonide and indium arsenide and aluminum antimonide, or alloys thereof.

16. A quantum well structure as in claim 1 comprising barrier layers of aluminum antimonide or an alloy thereof, and a quantum confinement region comprising gallium antimonide and indium arsenide or alloys thereof.

17. A quantum well structure as in claim 1 comprising indium antimonide and cadmium telluride and mercury telluride, or alloys thereof.

18. A quantum well structure as in claim 1, comprising barrier layers of cadmium telluride or an alloy thereof, and a quantum confinement region comprising indium antimonide and mercury telluride or alloys thereof.

19. A quantum well structure as in claim 6, wherein the barrier layers consist of indium phosphide, the quantum confinement region consists of first and second distinct regions of material, the first region consisting of GaInAsP, and the second region consisting of GaInAs.

20. A quantum well structure as in claim 19, wherein said first and second regions are of substantially equal thickness.

21. A quantum well structure as in claim 19, wherein said first region is at least twice as thick as said second region.

22. A quantum well structure as in claim 19 wherein said quantum confinement region is between 40 and 110 Angstroms wide.

23. A quantum well structure as in claim 1, comprising barrier layers of aluminum arsenide, a first material region of said quantum confinement region comprising InGaAs, a second material region of said quantum confinement region comprising GaSbAs.

24. A quantum well structure as in claim 23, wherein the quantum confinement region is less than 100 Angstroms in thickness.

25. A quantum well structure as in claim 1 wherein the quantum confinement region does not exceed 50 Angstroms in thickness.

26. A multiple quantum well structure comprising a plurality of quantum wells as in claim 1.

27. A multiple quantum well structure comprising a plurality of quantum wells as in claim 1 wherein the dipoles in each of the wells are of the same sense.

28. A composite multiple quantum well structure comprising a plurality of subsidiary multiple quantum well structures as in claim 27, alternate ones of said subsidiary structures having the sense of their dipoles reversed.

29. An optical modulator comprising a quantum well structure as in claim 1.

30. An optical modulator as in claim 29 arranged for propagation of light to be modulated in a direction substantially parallel to the planes of the layers of the wells.

31. An optical modulator as in claim 29 arranged for propagation of light to be modulated in a direction substantially perpendicular to the planes of the layers of the wells.

32. A quantum well structure as in claim 5, wherein the heterostructure is formed of two material layers, the conduction band minimum in said first material region being at a lower energy than that in said second material region and the valence band maximum being at a higher energy in said first material region than in said second region.

* * * * *